United States Patent [19]

Dollman

[11] 3,876,435

[45] Apr. 8, 1975

[54] CHROMATE CONVERSION COATING SOLUTIONS HAVING CHLORIDE, SULFATE, AND NITRATE ANIONS

[75] Inventor: David Y. Dollman, Doylestown, Pa.

[73] Assignee: Amchem Products, Inc., Ambler, Pa.

[22] Filed: Oct. 1, 1973

[21] Appl. No.: 402,641

[52] U.S. Cl.................................. 106/14; 148/6.2
[51] Int. Cl............................................. C09d 5/08
[58] Field of Search...................... 106/14; 148/6.2

[56] References Cited
UNITED STATES PATENTS

| | | | |
|---|---|---|---|
| 2,276,353 | 3/1942 | Thompson | 148/6.2 |
| 2,798,830 | 7/1957 | Newhard et al. | 148/6.2 |
| 2,868,679 | 1/1959 | Pimbley | 148/6.2 |
| 3,752,708 | 8/1973 | Newell et al. | 148/6.2 |
| 3,755,018 | 8/1973 | Miller | 148/6.2 X |

*Primary Examiner*—Lewis T. Jacobs
*Attorney, Agent, or Firm*—Ernest G. Szoke; Howard S. Katzoff; Michael E. Zall

[57] ABSTRACT

A coating solution and method for producing a chromate conversion coating on aluminum surfaces wherein soft or deionized water is employed as the diluent, the coating solution comprised of soft or deionized water, hexavalent chromium, fluoride, and an anion or anions selected from the group consisting of nitrate, chloride, and sulfate. The presence of the anions therein improves the characteristics of the corrosion resistant coating formed on aluminum surfaces, to which can be applied an organic finish such as a paint, lacquer, enamel or the like.

5 Claims, No Drawings

CHROMATE CONVERSION COATING SOLUTIONS HAVING CHLORIDE, SULFATE, AND NITRATE ANIONS

BACKGROUND OF THE INVENTION

It is well known that the durability and corrosion resistance of an aluminum surface can be improved by forming thereon a chromate conversion coating by contacting the surface with an aqueous acidic coating composition comprised of hexavalent chromium and fluoride. Typical examples of such compositions and processes are disclosed in U.S. Pat. Nos. 2,276,353; 2,851,385; and 2,796,370. The diluent for such coating compositions can be any conveniently available commercial water supply. The corrosion resistance of a conversion coating can be adversely affected by the hardness of the diluent water used in preparation of the coating bath. In order to minimize the adverse affects on corrosion resistance, attempts have been made to soften the diluent water. For example, dissolved mineral salts have been removed from the diluent prior to preparation of the coating bath.

Soft water is occasionally the only commercial water available to a metal treatment plant. Due to water conservation efforts, water is frequently recycled. Deionized water from such recycling operations is then utilized in the preparation of coating baths. It has been observed that when soft water is employed to prepare a conversion coating bath, the coatings produced therewith exhibit inferior corrosion resistance. In addition, the resultant coating weights are less than expected.

It is an object of this invention to produce an improved corrosion resistant coating on an aluminum surface by contacting the surface with a chromate conversion coating solution wherein the diluent is deionized or soft water.

Another object of this invention is to produce a coating on an aluminum surface which enhances the adhesion and appearance of a subsequently applied organic finish.

Another object of this invention is the formation of coatings of increased weight when soft water is employed in the coating solution.

DETAILED DESCRIPTION

It has been discovered that when soft, deionized, or otherwise demineralized water is used as a diluent for preparing a chromate coating composition comprised of hexavalent chromium and fluoride, for use on aluminum surfaces, the coatings produced thereon exhibit improved corrosion resistance when one or more anions selected from the group consisting of nitrate, chloride and sulfate are added to the composition. It has also been observed that addition of the anions to the coating composition increases the thickness of the coating formed on an aluminum surface.

The term "aluminum" employed herein includes aluminum and alloys thereof. The terms "coating solution" and "aqueous coating solution" used herein mean a coating composition of the present invention comprising hexavalent chromium, fluoride, soft or deionized water, and one or more anions selected from the group consisting of nitrate, chloride, and sulfate.

Water hardness refers to the amount of dissolved alkaline earth minerals present in water. The aggregate amount of minerals in solution is expressed in equivalents of calcium carbonate. "Soft water" when used herein means water having less than 100 parts per million (ppm) of calcium carbonate equivalents. The term "deionized water" when used herein, means water which is substantially free of salts. The term "soft or deionized water" means the water to be used in the coating solution of the present invention, and both soft and deionized water are considered equivalent for the purpose of the present invention. When used herein, the term "diluent" means an agent which acts to dissolve and dilute.

The source of the anions in the coating solution can be any compound which dissociates in aqueous solution to yield one or more anions selected from the group consisting of nitrate, chloride and sulfate. By way of example, the addition of sodium chloride to a coating bath comprised of sodium dichromate, fluoboric acid and hydrofluoric acid, yields chloride anions in solution.

The anions can be added in any convenient form such as the acid or salts thereof. Of course, the compound which is employed as the source for the anion or anions should not interfere with the coating process. Preferably, the acid or alkali metal an ammonium salts should be used.

The concentrations of nitrate in the coating solution can be from about 0.1 grams/liter to about 3 grams/liter. Preferably, nitrate should be present in an amount from about 0.2 grams/liter to about 2 grams/liter.

The concentration of chloride anion in the coating solution can be from about 0.005 grams/liter to about 0.2 grams/liter. Preferably, the concentration of chloride should be from about 0.025 grams/liter to about 0.1 grams/liter.

The concentration of sulfate anion in the coating solution can be from about 0.005 grams/liter to about 0.2 grams/liter. Preferably, the concentration of sulfate should be from about 0.025 grams/liter to about 0.1 grams/liter.

As has been indicated hereinabove one or more of the anions can be employed in the coating solution. Should more than one of the anions be present in the coating solution, their total concentration can be from about 0.12 grams/liter to about 3.2 grams/liter.

It has been observed that when chloride and sulfate are present in the coating solution, the aggregate concentration of said anions should be from about 0.01 grams/liter to about 0.2 grams/liter.

As noted hereinabove, the chromate coating compositions to which the anions of the present invention are added, are comprised of hexavalent chromium and fluoride. The concentrations of the coating producing constituents present therein will ordinarily be from about 1 gram/liter to about 15 grams/liter of hexavalent chromium calculated as $CrO_3$ and from about 0.1 grams/liter to about 5 grams/liter of fluoride.

In addition to hexavalent chromium and fluoride, these coating compositions can have additional constituents therein such as ferricyanide, iron, tin, zirconium, tantalum, silicon, titanium and boron. Cations such as hydrogen, potassium, sodium and ammonium can also be present.

The coating solutions of the present invention can be prepared in a variety of ways. The compounds yielding the anions can be added to chromate coating compositions in any convenient form. For example, compounds which will later dissociate in solution to yield the anions can be added as a dry admixture containing one or more alkali metal salts of the anions to a dry admixture of chromate and fluoride salts. Alternatively one or more anions selected from the group consisting of nitrate, chloride and sulfate can be added in the form of a liquid concentrate of their acids or salts to an aqueous chromate coating composition to form the coating solution of the present invention.

The anions can also be provided in an aqueous concentrate having chromate and fluoride therein. A one-package concentrate is made thereby, which when diluted with soft or otherwise demineralized water will produce a coating solution within the scope of the present invention.

Another method of preparation is to add the anions to the soft water diluent prior to addition of the chromate and fluoride to form the coating solution. Other methods of preparation of the coating solution will be readily apparent to those skilled in the art.

The pH of the coating solution can be adjusted when necessary by suitable additions of acid or base. For example, sodium hydroxide can be added to the coating solution to adjust the pH within the limits described hereinbelow. The sodium hydroxide can, in fact, be added to the liquid concentrate comprising anion salts. When sodium hydroxide is included in the liquid concentrate having for example, sodium nitrate, it is preferable that the anion salt and the sodium hydroxide be added to the water simultaneously to prevent overheating of the concentrate.

Should an acid be added to adjust the pH, it can serve as a source for one or more of the anions selected from the group consisting of nitrate, chloride, and sulfate.

Formula 1 is an example of a suitable concentrate which when added to an aqueous chromate coating composition, results in a coating solution of the present invention.

FORMULA 1

|  | Grams |
|---|---|
| sodium hydroxide | 100.0 |
| sodium nitrate | 150.0 |
| sodium chloride | 3.0 |
| deionized water | (to make one liter) |

Alternatively, a one-package concentrate can be employed. Formula 2 is an example of a liquid concentrate having the hexavalent chromium, fluoride and anions therein.

FORMULA 2

|  | Grams |
|---|---|
| sodium dichromate, dihydrate | 150.0 |
| nitric acid, 38–39°Be | 27.3 |
| hydrofluoric acid, 70% | 6.3 |
| sodium chloride | 0.4 |
| deionized water | (to make one liter) |

Formula 3 is an example of a dry admixture which can be added to soft water to form a coating solution within the scope of the present invention.

FORMULA 3

|  | grams |
|---|---|
| chromic acid | 5.45 |
| potassium zirconium fluoride | 2.28 |
| sodium fluoborate | 7.28 |
| sodium chloride | 0.028 |
| potassium nitrate | 0.24 |

Formula 4 is a typical example of a coating solution having ferricyanide and the nitrate anion therein.

FORMULA 4

|  | grams |
|---|---|
| chromic acid | 4.0 |
| hydrofluoric acid | 1.0 |
| potassium ferricyanide | 1.0 |
| sodium nitrate | 1.5 |
| soft water | (to make one liter) |

Formula 5 is a typical example of a coating solution wherein the nitrate, chloride, and sulfate anions are present.

FORMULA 5

|  | grams |
|---|---|
| sodium dichromate | 12.0 |
| fluoboric acid | 1.7 |
| hydrofluoric acid | 0.3 |
| sodium nitrate | 0.2 |
| sodium chloride | 0.015 |
| sodium sulfate | 0.015 |
| soft water | (to make one liter) |

Temperature, pH, and the duration of contact time between the aluminum surface and the coating solution influence the degree and quality of the resulting coating. The pH of the coating solution can be from about 1.0 to about 2.5. Preferably, the pH should be from about 1.5 to about 2.0.

The coating solution can be employed at temperatures from about 10°C to about 75°C. It is preferred to apply the coating solution at about ambient temperature, that is from about 21°C to about 50°C.

A contact time from about 2 seconds to about 5 minutes can be employed.

Preferably, a contact time of from about 10 seconds to about 2 minutes should be employed.

The contact time, pH and temperature of the coating solution can differ from one solution to another and should be selected to produce the desired coating.

Application of the coating solution can be effected by any suitable method known to the art such as immersion, spray, roller coating and the like.

During the process of the present invention, replenishment of the solution is necessary from time to time. The need for chromate and fluoride can be determined by conventional techniques known to the art. For example, chromate content can be determined by a simple iodimetricthiosulfate titration.

When hexavalent chromium and fluoride require replenishment, addition of a concentrate having a hexavalent chromium and fluoride can be employed. A suitable replenisher can, for example be the original make-up concentrate. The pH can be adjusted as stated hereinabove, should it be found necessary to do so.

When the anions require replenishment, the amount to be added should be sufficient to maintain the concentration of the anions in the coating solution within the concentrations specified hereinabove. It has been found that the rate of depletion of the anions in an operating coating solution is considerably less than the rate of depletion of hexavalent chromium and fluoride. This necessitates more frequent replenishment of the chromium and fluoride. The replenishment compositions to be employed in the present invention can be comprised of chromate and fluoride, when these constituents in the coating solution have been depleted; and can be comprised of chromate, fluoride, and anions selected from the group consisting of nitrate, chloride, and sulfate when in addition, the anions need to be replenished in solution. Should the coating solution having therein, other constituents such as ferricyanide, require replenishment, ferricyanide can be supplied. Any additional constituents such as those specified hereinabove can be similarly replenished. Of course, the anions can be replenished by simple addition of an anion acid or salt while continual replenishment of the coating solution is effected with hexavalent chromium and fluoride.

The aluminum surface should be clean prior to contact with the coating solution. Any method can be employed so long as the aluminum surface is rendered free of organic and inorganic contaminants which interfere with full and uniform contact between the metallic surface and the coating solution. For example, an alkaline cleaner can be used to render the surface free of contaminants. A water rinse following the cleaning step and prior to contact with the coating solution can be employed to remove residual solvent or loose particles and to prevent contamination of the coating solution. After cleaning and rinsing is accomplished, the metal surface can also be deoxidized by an acid deoxidizing solution. Subsequent to the cleaning and the deoxidizing steps, a water rinse can be utilized and the metal surface contacted with the coating solution.

The metal surface can be rinsed with water following contact with the coating solution. An acidulated rinse can also be employed, followed by a water rinse step. The water rinse steps can be accomplished by employing any commercial water supply, soft water or deionized water. It is preferable that the water rinse following an acidulated rinse and prior to painting be effected with deionized water. The work piece is then dried and an organic finish such as paint, lacquer, or enamel can be applied thereon.

The following examples further illustrate the present invention. It should be understood, however, that the invention is not limited solely to the particular examples set forth below.

Examples 1 and 2 are of the coating solution of the invention.

Examples 3, 4, and 5 illustrate the use of the coating solution of the present invention.

EXAMPLE 1

To 925 ml of soft water was added with stirring, 75 ml of an aqueous concentrate comprising:

| | |
|---|---|
| sodium dichromate-dihydrate | 135.9 grams |
| fluoboric acid (48% wt) | 43.5 grams |
| hydrofluoric acid (70% wt) | 5.7 grams |
| deionized water | (to make one liter) |

To the above solution was added 10 ml of the aqueous concentrate of Formula 1 with stirring. The pH of the resulting coating solution when measured by a Beckman calomel and glass electrode pH meter was found to be 2.0.

EXAMPLE 2

To 1,000 ml. of soft water was added while stirring, 15 grams of a dry admixture comprising:

| | |
|---|---|
| chromic acid | 363 grams |
| potassium fluozirconate | 152 grams |
| sodium fluoborate | 485 grams |

To the resulting solution, was added while stirring, 1 gram of the following dry admixture:

| | |
|---|---|
| potassium nitrate | 944 grams |
| sodium chloride | 28 grams |
| sodium sulfate | 28 grams |

EXAMPLE 3

3 inch × 10 inch test panels of 7075 aluminum alloy were used in this procedure. The panels were cleaned with an alkaline silicated cleaner and deoxidized with an acid deoxidizer. A water rinse was employed following each step. Thereafter the panels were contacted with the coating solutions listed in Table 3 below by immersing the test panels in the solutions for two minutes at 32°C.

The coating solutions employed were as follows: a) the coating solution as prepared in Example 1 hereinabove, b) the dry admixture of Formula 3 hereinabove added to one liter of soft water, c) Formula 4 hereinabove, and d) Formula 5 hereinabove.

Following treatment, the panels were rinsed with water and air dried. The panels thus dried at room temperature (21°C) were placed at an incline of 6° from vertical and subjected to a neutral salt spray (fog) of 5 percent sodium chloride solution at a temperature of 35°C for 336 hours according to ASTM B-117.

Control panels were alkaline cleaned, deoxidized, and water rinsed subsequent to cleaning and deoxidizing. The control panels were immersed for 2 minutes at a temperature of 32°C in an aqueous composition comprising:

| | |
|---|---|
| chromic acid | 5.63 grams |
| potassium fluozirconate | 2.36 grams |
| sodium fluoborate | 7.50 grams |
| deionized water | (to make one liter) |
| pH | 1.5 |

Following immersion in the above composition, the control panels were rinsed in water, air dried at room temperature (21°C) and subjected to the 5 percent salt spray according to ASTM B-117.

Coating weights were determined by the weight loss in a stripping solution comprised of nitric acid (70 percent) and water in the weight ratio of 1:1. To determine the weight loss, the panels were weighed on an analytical balance to ±0.1 mg. and immersed for 1 minute in the stripping solution. They were again weighed and the difference in weight is used to calculate the coating weight. The coating weights are listed in Table 3. The panels were observed for their appearance, i. e., color of coating, and these observations are set forth in Table 3.

The test and control panels were evaluated for corrosion by observing pitting and number of pits per panel. The panels were rated pass or fail. Passing panels were required to be free of pitting, visible to the unaided eye, and to have a coating weight greater than 40 mg/sq.ft. The results are listed in Table 3 below.

TABLE 3

| Coating Treatment | Coating Weight mg/sq.ft. | Rating | Appearance |
|---|---|---|---|
| a) Coating Solution prepared in Ex. 1 | 58 | pass | iridescent red |
| b) Formula 3 + 1 liter soft water | 60 | pass | gold-yellow |
| c) Formula 4 | 106 | pass | brown |
| d) Formula 5 | 61 | pass | gold-yellow |
| Control | 17 | fail | light yellow |

EXAMPLE 4

3 inch × 10 inch test panels of 2024 aluminum alloy were used in this procedure. The panels were cleaned with an alkaline silicated cleaner and deoxidized with an acid deoxidizer. A water rinse was employed following each step. Thereafter the panels were contacted with the solutions listed in Table 4 below by spraying the test panels with the solutions for 60 seconds at 32°C. The coating solutions employed were as follows:
  a. The coating solution as prepared in Example 1 hereinabove.
  b. The dry admixture of Formula 3 added to one liter of soft water.
  c. Formula 4 hereinabove.
  d. Formula 5 hereinabove.

Following treatment the panels were rinsed with water and air dried. The panels thus dried at room temperature, 21°C were placed at an incline of 6° from vertical and subjected to a neutral salt spray, at a temperature of 35°C for 336 hours according to ASTM B-117.

Control panels were alkaline cleaned, deoxidized and rinsed subsequent to cleaning and deoxidizing. The control panels were contacted with the following composition by spraying for 1 minute at 32°C:

| | |
|---|---|
| chromic acid | 5.63 grams |
| potassium fluozirconate | 2.36 grams |
| sodium fluoborate | 7.50 grams |
| deionized water | (to make one liter) |
| pH | 1.5 |

Following contact by spraying with the above composition, the control panels were rinsed in water, air dried at room temperature (21°C) and subjected to the 5 percent salt apray according to ASTM B-117.

Coating weights were determined by the nitric acid stripping procedure described in Example 3 above. The coating weights are listed in Table 4. The panels were observed for their appearance, i.e., color of coating and these observations are set forth in Table 4. The test and control panels were evaluated for corrosion by observing pitting and number of pits per panel. The panels were rated pass or fail. Passing panels were required to be free of pitting visible to the unaided eye, and to have a coating weight greater than 40 mg/sq.ft. The results are listed in Table 4 below.

TABLE 4

| Coating Treatment | Coating Weight mg/sq.ft. | Rating | Appearance |
|---|---|---|---|
| a) Coating Solution of Example 1 | 70 | pass | yellow |
| b) Formula 3 + 1 liter soft water | 63 | pass | yellow |
| c) Formula 4 | 111 | pass | brown |
| d) Formula 5 | 83 | pass | brown |
| Control | 32 | fail | iridescent red |

EXAMPLE 5

3 inch × 4 inch panels of 7075 aluminum alloy were cleaned, deoxidized and water rinsed after each step in preparation for immersion in the coating solution in the manner described in Example 3 above. Test panels were immersed in coating solutions having 15 mg/l, 30 mg/l, or 60 mg/l of sulfate anion therein respectively. The coating solutions were comprised of:
  a. 5.45 g/l $CrO_3$, 2.28 g/l $K_2ZrF_6$, 7.28 g/l $NaBF_4$, 0.022 g/l $Na_2SO_4$ and deionized water to make a liter of coating solution;
  b. 5.45 g/l $CrO_3$, 2.28 g/l $K_2ZrF_6$, 7.28 g/l $NaBF_4$, 0.044 g/l $Na_2SO_4$ and deionized water to make a liter of coating solution;
  c. 5.45 g/l $CrO_3$, 2.28 g/l $K_2ZrF_6$, 7.28 g/l $NaBF_4$, 0.088 g/l $Na_2SO_4$ and deionized water to make a liter of coating solution.

Control panels of 7075 aluminum alloy were cleaned, deoxidized, and water rinsed after each step. The control panels were immersed for two minutes in a composition comprised of:
  d. 5.45 g/l $CrO_3$, 2.28 g/l $K_2ZrF_6$, 7.28 g/l $NaBF_4$ and deionized water to make one liter of solution.

All panels were rinsed in water following the coating step and allowed to air dry. The coating weights produced on the panel surfaces were determined by the weight loss procedure described in Example 3 hereinabove. The coating weights are shown in Table 5 below.

TABLE 5

| Coating Treatment | Coating weight mg/sq.ft. |
|---|---|
| a) Solution comprising (15 mg/l $SO_4$ anion) | 42 |
| b) Solution comprising (30 mg/l $SO_4$ anion) | 51 |
| c) Solution comprising (60 mg/l $SO_4$ anion) | 56 |
| d) Control composition | 27 |

I claim:

1. In the method of applying a chromate conversion coating to an aluminum surface wherein the surface is contacted with an aqueous coating solution comprising hexavalent chromium and fluoride; the improvement comprising when soft or deionized water is present in the solution, one or more anions selected from the group consisting of nitrate, chloride and sulfate is incorporated in the solution wherein when nitrate is present in the solution it is present in the amount of from about 0.1 grams/liter to about 3.0 grams/liter; when chloride is present in the solution, it is present in the amount of from about 0.005 grams/liter to about 0.2 grams/liter and; when sulfate is present in the solution, it is present in the amount of from about 0.005 to about 0.2 grams/liter and; wherein when chloride and sulfate are present in the coating solution, they are present in an aggregate concentration of from about 0.01 grams/liter to about 0.2 grams/liter; and wherein when nitrate, chloride and sulfate are present in the coating solution, they are present in an aggregate concentration of from about 0.12 grams/liter to about 3.2 grams/liter.

2. A method according to claim 1 wherein the source of said anions is a water soluble acid or salt.

3. A method according to claim 1 wherein ferricyanide is present in said coating solution.

4. An aqueous coating solution comprising hexavalent chromium, fluoride, soft or deionized water, and one or more anions selected from the group consisting of nitrate, chloride and sulfate; wherein when nitrate is present in the solution it is present in the amount of from about 0.01 grams/liter to about 3.0 grams/liter; when chloride is present in the solution, it is present in the amount of from about 0.005 grams/liter to about 0.2 grams/liter and; when sulfate is present in the solution it is present in the amount of from about 0.005 grams/liter to about 0.2 grams/liter and; wherein when chloride and sulfate are present in the coating solution, they are present in an aggregate concentration of from about 0.01 grams/liter to about 0.02 grams/liter; and wherein when nitrate, chloride and sulfate are present in the coating solution, they are present in an aggregate concentration of from about 0.12 grams/liter to about 3.2 grams/liter.

5. An aqueous coating solution comprising hexavalent chromium, fluoride, ferricyanide, soft or deionized water, and one or more anions selected from the group consisting of nitrate, chloride, and sulfate; wherein when nitrate is present in the solution it is present in the amount of from about 0.1 grams/liter to about 3.0 grams/liter; when chloride is present in the solution, it is present in the amount of from about 0.005 grams/liter to about 0.2 grams/liter and; when sulfate is present in the solution, it is present in the amount of from about 0.005 grams/liter to about 0.2 grams/liter; and wherein when chloride and sulfate are present in the coating solution, they are present in an aggregate concentration of from about 0.01 grams/liter to about 0.2 grams/liter; and wherein when nitrate, chloride, and sulfate are present in the coating solution, they are present in an aggregate concentration of from about 0.12 grams/liter to about 3.2 grams/liter.

* * * * *